(12) United States Patent
Sun

(10) Patent No.: US 8,462,493 B2
(45) Date of Patent: Jun. 11, 2013

(54) MOUNTING MECHANISM FOR STORAGE DEVICE AND ELECTRONIC DEVICE HAVING SAME

(75) Inventor: Zheng-Heng Sun, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 528 days.

(21) Appl. No.: 12/690,852

(22) Filed: Jan. 20, 2010

(65) Prior Publication Data

US 2011/0127394 A1   Jun. 2, 2011

(30) Foreign Application Priority Data

Nov. 27, 2009   (CN) .......................... 2009 1 0310573

(51) Int. Cl.
G06F 1/16 (2006.01)
H05K 5/00 (2006.01)
H05K 7/00 (2006.01)

(52) U.S. Cl.
USPC ............ 361/679.39; 361/679.33; 361/679.37; 361/679.38; 248/220.21; 248/220.22; 248/221.11; 248/298.1; 312/223.2

(58) Field of Classification Search
USPC ............ 361/679.33, 679.37, 679.39, 679.38; 248/694, 220.21, 220.22, 221.11, 225.11, 248/298.1, 274.1; 312/223.2, 333, 334.4–334.5; 292/80, 81, 84, 87–91, DIG. 53, DIG. 54, 292/DIG. 38, DIG. 63
See application file for complete search history.

(56) References Cited

U.S. PATENT DOCUMENTS

| | | | | |
|---|---|---|---|---|
| 5,100,015 A | * | 3/1992 | Vanderstuyf | 220/326 |
| 5,277,615 A | * | 1/1994 | Hastings et al. | 439/377 |
| 5,432,682 A | * | 7/1995 | Giehl et al. | 361/796 |
| 5,783,777 A | * | 7/1998 | Kruse et al. | 174/66 |
| 6,351,379 B1 | * | 2/2002 | Cheng | 361/679.33 |
| 6,388,873 B1 | * | 5/2002 | Brooks et al. | 361/679.34 |
| 6,590,848 B1 | * | 7/2003 | Chen | 720/654 |
| 6,813,148 B2 | * | 11/2004 | Hsu et al. | 361/679.39 |
| 6,980,430 B2 | * | 12/2005 | Su | 361/679.39 |
| 7,072,177 B2 | * | 7/2006 | Peng et al. | 361/679.33 |
| 7,102,885 B2 | * | 9/2006 | Chen et al. | 361/679.31 |
| 7,190,574 B2 | * | 3/2007 | Muenzer et al. | 361/679.32 |
| 7,253,360 B2 | * | 8/2007 | Chen et al. | 174/50 |
| 7,423,869 B2 | * | 9/2008 | Su | 361/679.33 |
| 7,447,016 B2 | * | 11/2008 | Tsai et al. | 361/679.33 |
| 7,486,510 B2 | * | 2/2009 | Han et al. | 361/679.33 |
| 7,540,574 B2 | * | 6/2009 | Wu et al. | 312/223.2 |
| 7,835,148 B2 | * | 11/2010 | Tu | 361/679.39 |
| 7,924,557 B2 | * | 4/2011 | Li | 361/679.37 |
| 2007/0159786 A1 | * | 7/2007 | Liu et al. | 361/685 |

* cited by examiner

*Primary Examiner* — Terrell McKinnnon
*Assistant Examiner* — Michael McDuffie
(74) *Attorney, Agent, or Firm* — Altis Law Group, Inc.

(57) ABSTRACT

A mounting mechanism for assembling a storage device includes a pair of parallel brackets and a latching member. Each of the brackets defines a sliding slot and a latching hole therein. A space is defined between the brackets for receiving the storage device. The latching member includes a resisting portion for abutting the storage device and a pair of latching portions formed at opposite ends of the resisting portion. Each of the latching portions includes a hook engaged in the latching hole of the bracket.

9 Claims, 7 Drawing Sheets

MOUNTING MECHANISM FOR STORAGE DEVICE AND ELECTRONIC DEVICE HAVING SAME

BACKGROUND

1. Technical Field

The present disclosure relates to mounting mechanisms, and particularly, to a mounting mechanism which can facilitate attachment of a storage device to a chassis of an electronic device.

2. Description of Related Art

Storage devices, such as hard disk drives, compact disk read-only memory (CD-ROM) drives and digital video disc (DVD) drives, are typically secured in computer chassis with screws. Operating threaded fastening elements involving such devices is complicated and time-consuming.

What is needed, therefore, is a mounting mechanism to overcome the associated limitations.

DETAILED DESCRIPTION

Figure 1:
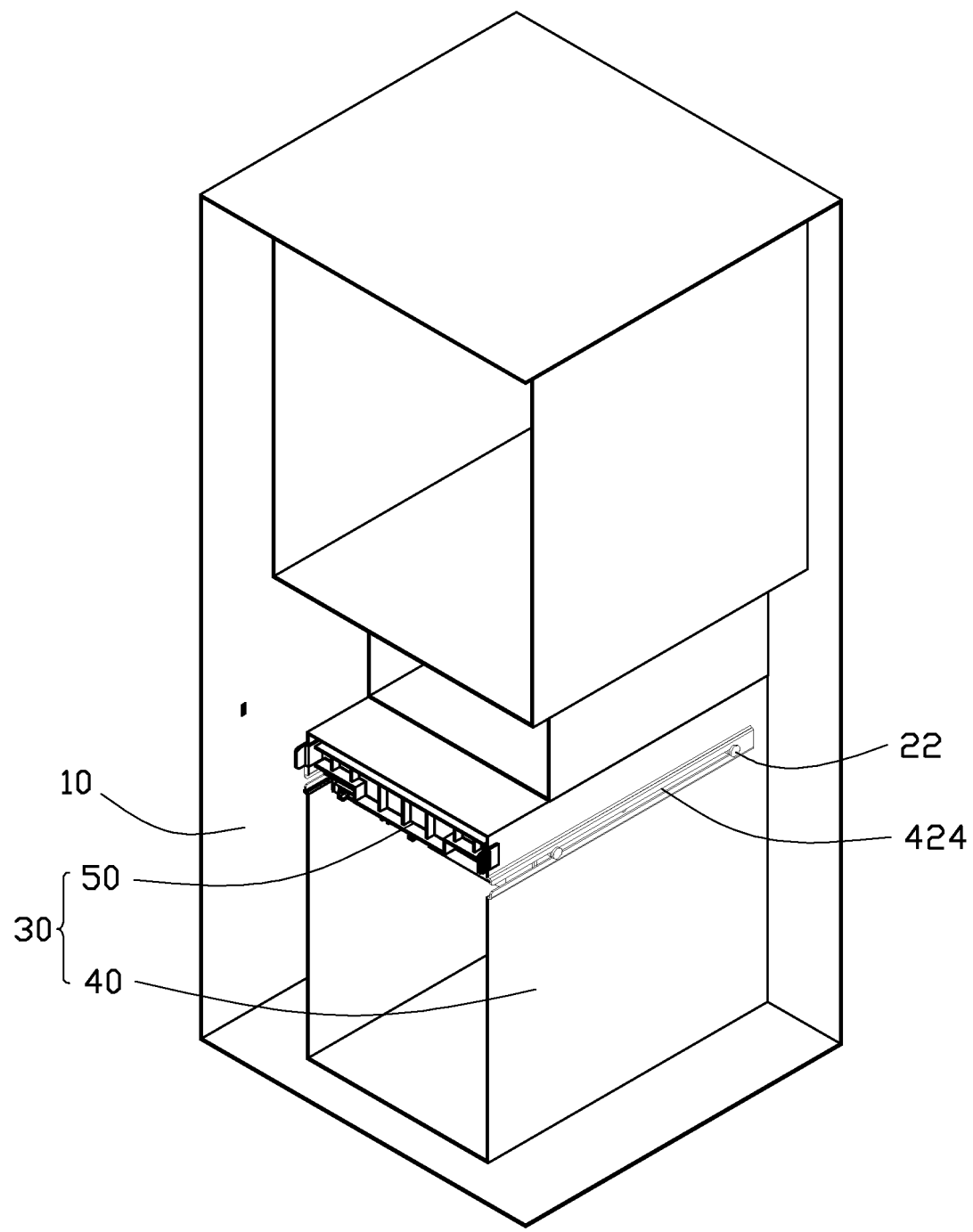
FIG. 1 shows a storage device latched in a computer chassis by a mounting mechanism according to an exemplary embodiment.
Figure 2:
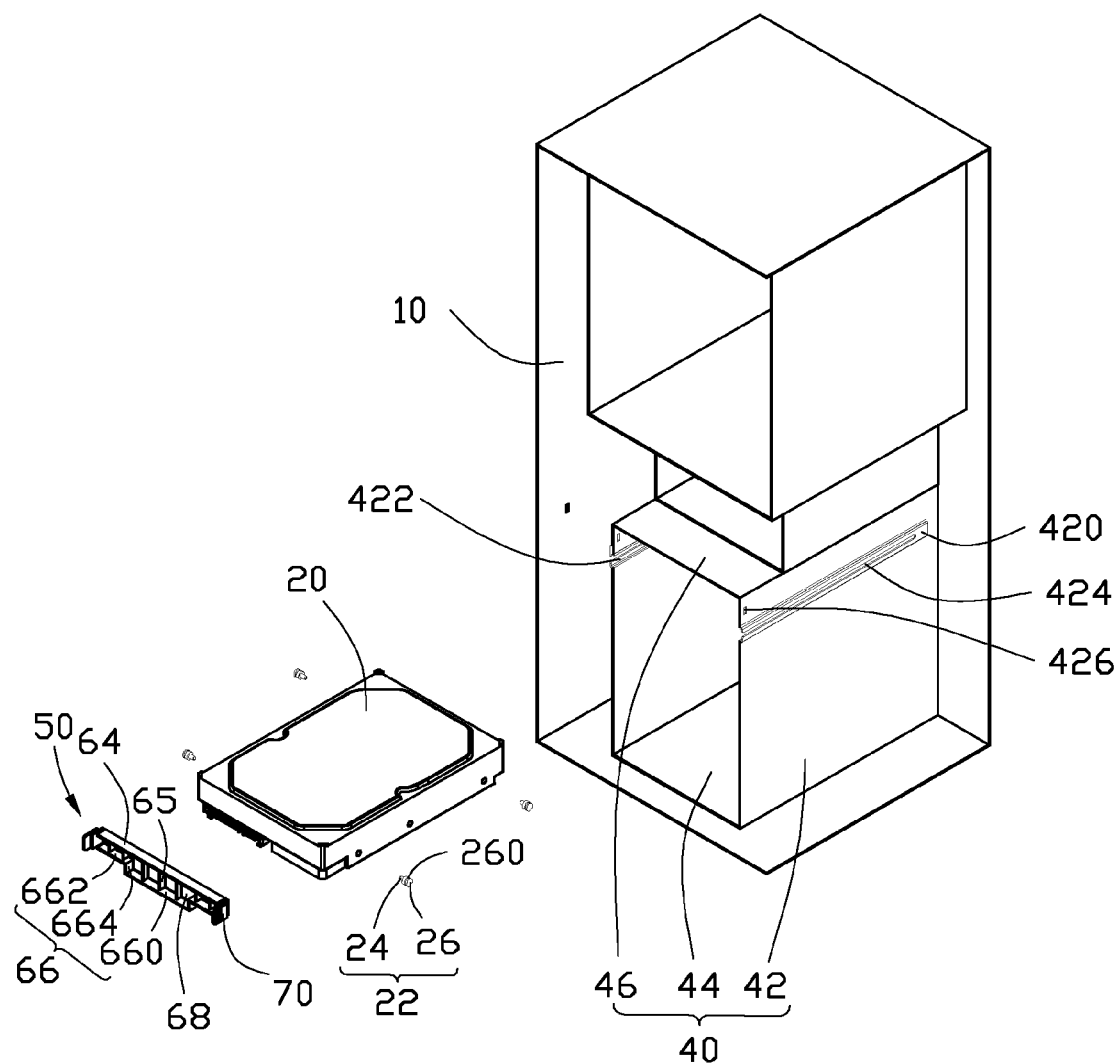
FIG. 2 is an exploded view of FIG. 1.

Referring to FIGS. 1 and 2, a mounting mechanism 30 according to an exemplary embodiment is shown. The mounting mechanism 30 is for holding a storage device 20 in a chassis 10 of an electronic device, such as a computer.

As shown in FIG. 2, the storage device 20 is rectangular. A plurality of bolts 22 are fixed on opposite longer sides of the storage device 20. In this embodiment, there are two bolts 22 at each longer side of the storage device 20. The bolts 22 are spaced apart, and all are away from the shorter sides of the storage device 20. Each of the bolts 22 includes a pole 24 and a cylindrical head 26 formed at a distal end of the pole 24. The diameter of the head 26 is wider than that of the pole 24. An annular notch 260 is defined in the head 26 of the bolt 22. Thus a portion of the head 22 corresponding to the annular notch 260 is narrower in diameter than the other portion of the head 22 without the annular notch 260.

The mounting mechanism 30 includes a frame 40 and a latching member 50 engaged with the frame 40.

The frame 40 is composed of relatively high intensity metal, and fixed in the chassis 10. The frame 40 includes two brackets 42 arranged parallel to each other, a bottom plate 44 interconnecting bottom edges of the brackets 42, and a top plate 46 interconnecting top edges of the brackets 42. The brackets 42 each are flat vertical sheets. A space 428 is defined between the brackets 42 for accommodating the storage device 20 therein. The width of the space 428 (i.e., a distance between the brackets 42), is substantially equal to that of the storage device 20. The length of the space 428 (i.e., the length of the bracket 42 in a horizontal direction) is longer than the storage device 20.

An elongated supporting portion 420 protrudes horizontally from each of the brackets 42 near the top edges thereof. An offset of the supporting portion 420 is substantially the same as the distance between the annular notch 260 of the bolt 22 and the corresponding longer side of the storage device 20 on which the bolt 22 is fixed. A height of the supporting portion 420 is slightly more than the width of the head 26 of the bolt 22. Long sides of each supporting portion 420 are curved or bent to form a groove 422.

A sliding slot 424 is defined in each groove 422 from the front end to near the rear end. The grooves 422 and sliding slots 424 act as rails to receive and guide the heads 26 of the bolts 22. A latching hole 426 is defined in each of the brackets 42. The latching hole 426 is formed above the sliding slot 424, and adjacent to the front edge of the bracket 42.

The sliding slot 424 is linear shaped and elongated. The sliding slot 424 is as wide as the diameter of the head 26 of the bolt 22 at the annular notch 260, but narrower than that of the other portion of the head 26 of the bolt 22. The length of the sliding slot 424 is slightly shorter than that of the supporting portion 420, but is longer than a distance between the front shorter side of the storage device 20 and the two bolts 22 adjacent to the rear shorter side of the storage device 20. The sliding slot 424 is semi-closed, which extends through the front end of the supporting portion 420, but not through the rear end of the supporting portion 420. The front end of the supporting portion 420 is chamfered at a periphery of the sliding slot 424 for facilitating mounting of the storage device 20. The distance between the rear end of the sliding slot 424 and the rear edge of the bracket 42 is not less than a distance between the rear shorter side of the storage device 20 and the two bolts 22 adjacent to the rear shorter side of the storage device 20.

Figure 3:
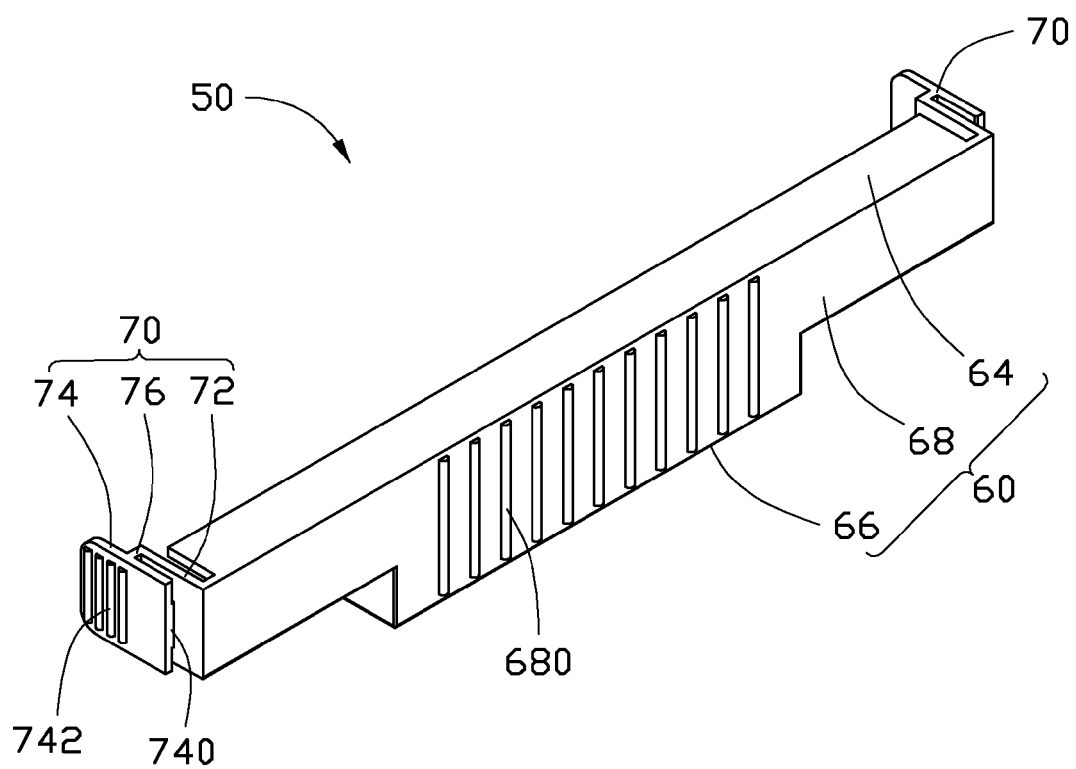
FIG. 3 shows a latching member of the mounting mechanism of FIG. 2 viewed from another aspect.

Referring to FIG. 3, the latching member 50 is flexible plastic formed via injection molding. The latching member 50 includes a resisting portion 60, and a pair of latching portions 70 formed at opposite ends of the resisting portion 60.

The resisting portion 60 includes a top board 64, a bottom board 66, and a side board 68. The top board 64 is rectangular and elongated. The length of the top board 64 is approximately the same as the width of the space 428 between the brackets 42. The bottom board 66 includes a main part 660, two end parts 662 at opposite ends of the main part 660, and two connecting parts 664 each interconnecting the main part 660 and one corresponding end part 662. The main part 660, the end parts 662, and the top board 64 are all arranged in parallel. The main part 660 is below the end parts 662, a distance between the main part 660 and the top board 64 is longer than that between the end parts 662 and the top board 64. Each of the connecting parts 664 perpendicularly intersects the corresponding end part 662 and the main part 660.

The side board 68 interconnects rear sides of the top board 64 and the bottom board 66 of the resisting portion 60. A length of the middle portion of the sideboard 68 corresponding to the main part 660 of the bottom board 66 is longer than a periphery of the side board 68 corresponding to the end parts 662 of the bottom board 66. A plurality of protruding ribs 680 extends from the middle portion of the sideboard 68. The protruding ribs 680 are all vertical and in parallel with each other. A plurality of reinforcement plates 65 is formed between the top board 64 and the bottom board 66, and connects to the sideboard 68.

The two latching portions 70 are the same as each other, and extend outwards from opposite ends of the sideboard 68 of the resisting portion 60. Each of the latching portions 70 includes an inner plate 72, an outer plate 74, and a connecting plate 76. The inner plate 72 extends perpendicularly from a corresponding end of the sideboard 68. The outer plate 74 is parallel to the inner plate 72. A narrow gap is defined between the inner plate 72 and the outer plate 74. The connecting plate 76 perpendicularly intersects the inner plate 72 and the outer plate 74. A width of the connecting plate 76 (i.e., the width of the gap) is about the same as a thickness of the bracket 42. In this embodiment, the inner plate 72 extends forward from the sideboard 68. The connecting plate 76 extends from a distal edge of the inner plate 72 to a middle of the outer plate 74. A hook 740 extends from the rear edge of the outer plate 74 into the gap. The distance between the hook 740 and the connecting plate 76 is substantially the same as that between the front edge of the bracket 42 and the latching hole 426. A plurality of anti-skid ribs 742 is formed on an outer surface of the outer plate 74 for facilitating assembly/disassembly of the latching member 50. The anti-skid ribs 742 and the hook 740 are formed at opposite ends of the outer plate 74.

Figure 4:
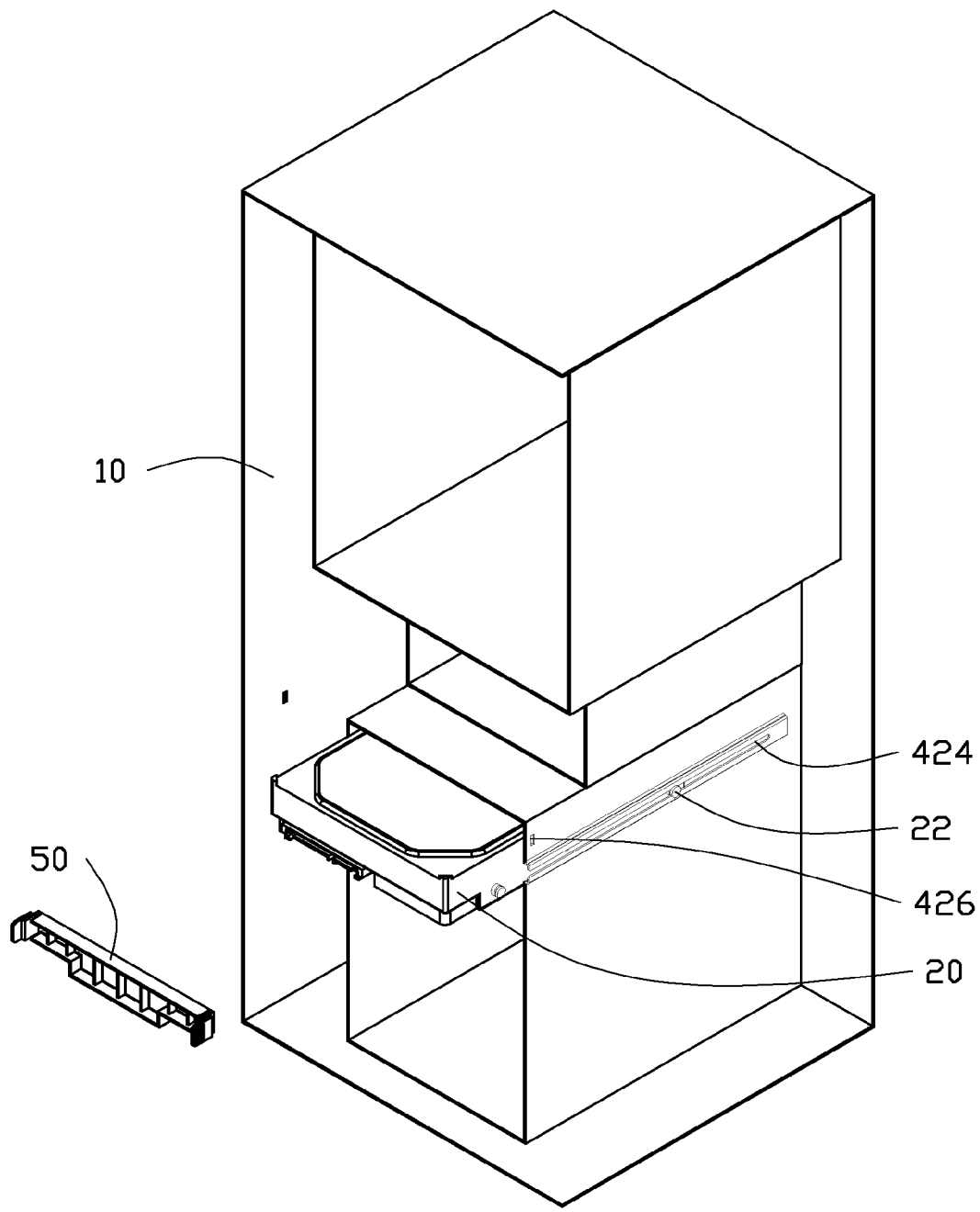
FIG. 4 shows the storage device mounted on the mounting mechanism, but not yet latched.

Referring to FIG. 4, when assembling the storage device 20 to the mounting mechanism 30, the storage device 20 is disposed in the space 428 via the front side of the frame 40. Firstly, the two bolts 22 adjacent to the rear shorter side of the storage device 20 enter into the sliding slots 424 of the brackets 42, respectively. The portion of the head 26 with the annular notch 260 is thus in the sliding slot 424, and the other portion of the head 26 without the annular groove 422 sandwiches the supporting portion 420 around the sliding slot 424. Thus, the bolts 22 cannot escape the supporting portions 420. Then the storage device 20 is further pushed into the space 428 until the bolts 22 encounter the rear ends of the supporting portions 420. Accordingly, the other two bolts 22 enter and slide in the sliding slots 424. In this way, the storage device 20 is entirely received in the space 428 with the front shorter side spaced from the front edges of the brackets 42. The chamfered supporting portions 420 of the brackets 42 enlarge the opening to the sliding slots 424, making it easy to insert the bolts 22 into the sliding slots 424, and thus facilitating mounting of the storage device 20 onto the frame 40.

Figure 5:
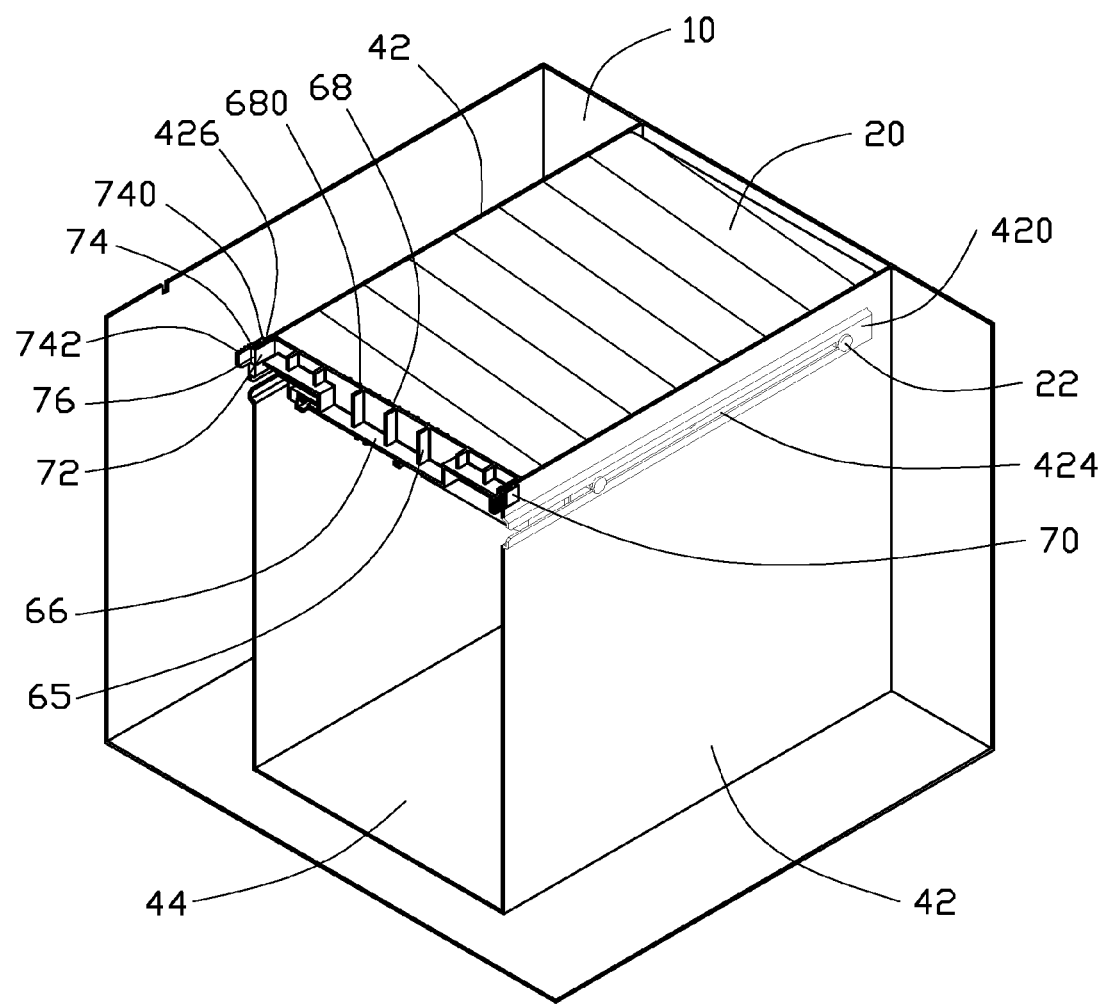
FIG. 5 is an isometric, cross-sectional view of FIG. 1.

Referring to FIGS. 1 and 5, the latching member 50 is assembled to the brackets 42 subsequent to mounting the storage device 20 to the brackets 42. Firstly, force is applied on the outer plates 74 of the latching portions 70 to cause the outer plates 74 to deform and rotate outwards to enlarge the gaps between the inner plates 72 and the outer plates 74. The latching member 50 is then mounted to the brackets 42 with the sideboard 68 of the resisting portion 60 facing the storage device 20. In such a state, the protruding ribs 680 abut against the front shorter side of the storage device 20 to keep the storage device 20 from escaping out of the frame 40. Each bracket 42 is sandwiched between the inner plate 72 and the outer plate 74 of the corresponding latching portion 70 with the latching hole 426 facing the hook 740. Subsequently, the force on the outer plates 74 is canceled, and the outer plates 74 become free again and engage in the corresponding latching holes 426 of the brackets 42. Therefore, the latching member 50 is assembled to the brackets 42 by the engagement of the hooks 740 of the latching member 50 and the latching holes 426 of the frame 40, and accordingly, the storage device 20 is stably fixed on the frame 40 by the latching member 50.

To disassemble the storage device 20, force can be applied on the outer plates 74 of the latching member 50 to cause the outer plates 74 to rotate outwards, and thus the hooks 740 escape from the latching holes 426. Accordingly, the latching member 50 disengages from the frame 40, and the latching member 50 can be taken away. With the latching member 50 removed from the frame 40, the storage device 20 is unlocked and removable. The storage device 20 can be easily and conveniently assembled to, and disassembled from the chassis 10 by the mounting mechanism 30.

Figure 6:
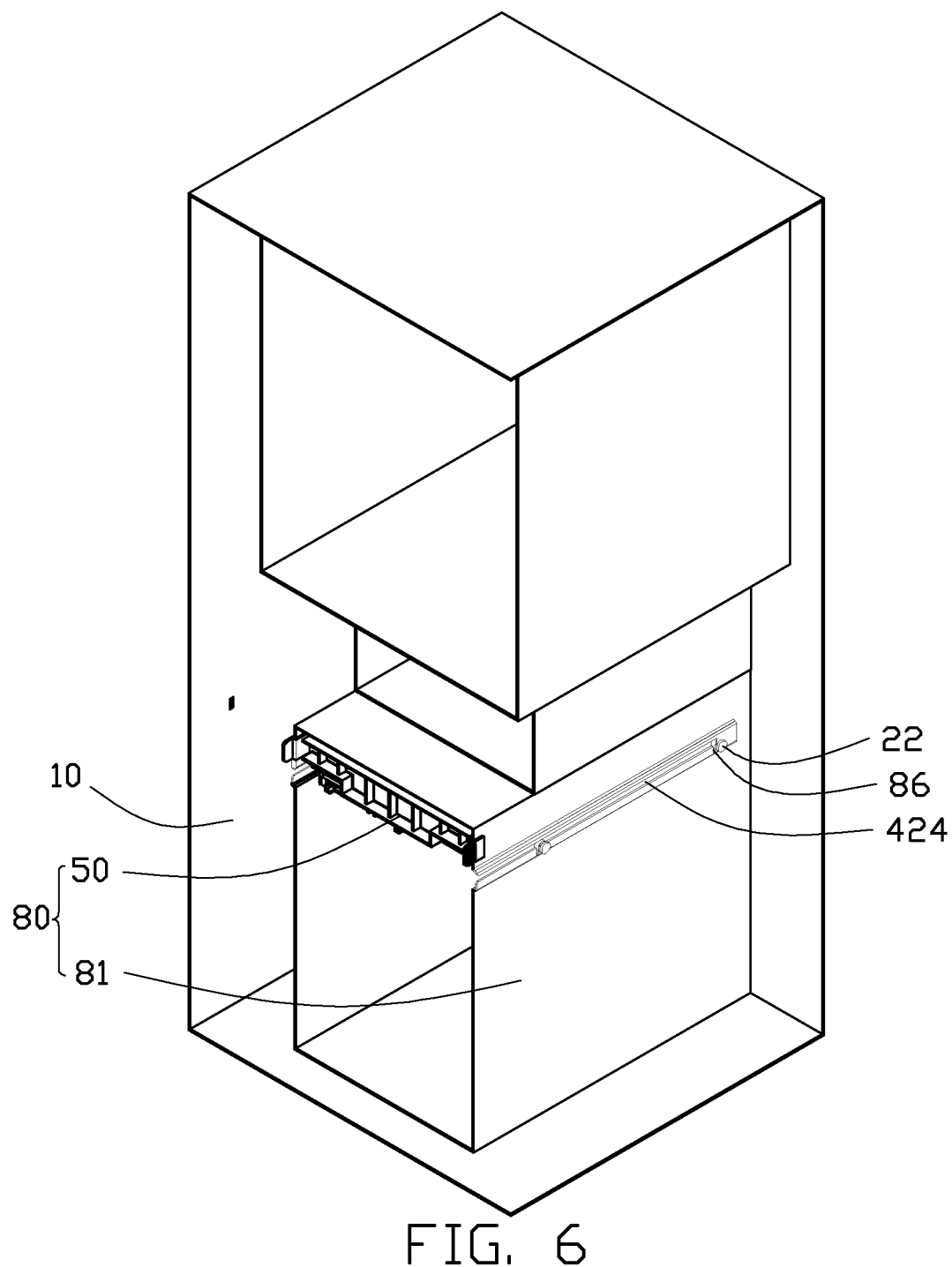
FIG. 6 shows the storage device latched in the computer chassis by a mounting mechanism according to an alternative embodiment.
Figure 7:
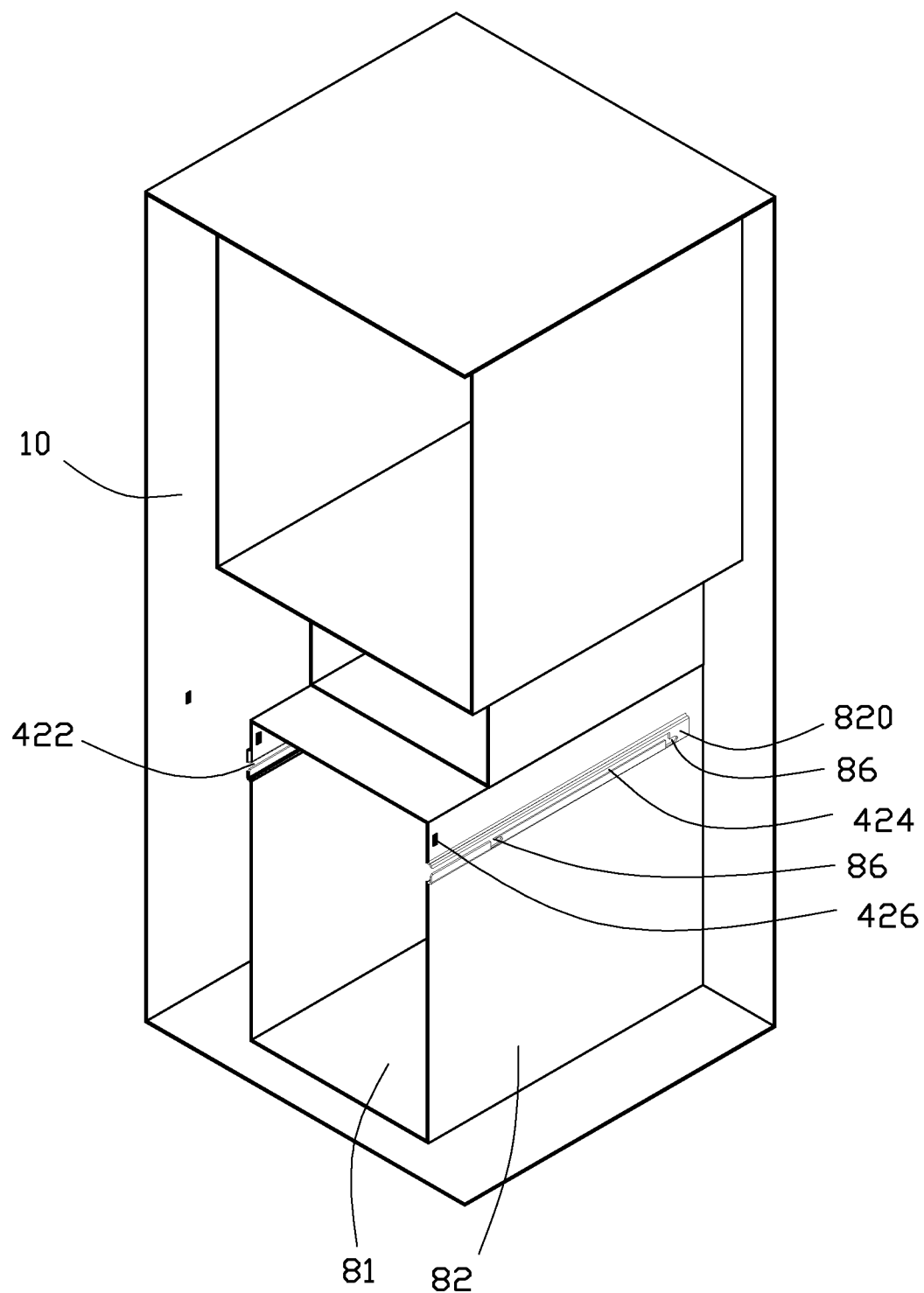
FIG. 7 is an isometric view of a frame of the mounting mechanism of FIG. 6.

Referring to FIGS. 6 and 7, a mounting mechanism 80 according to an alternative embodiment is shown. Different from the previous embodiment, there are two limiting grooves 86 extending downwards from each sliding slot 424 of the supporting portions 820 of the brackets 82 for receiving the bolts 22 of the storage device 20. The two limiting grooves 86 are spaced apart, and both communicate with the limiting groove 86. One of the limiting grooves 86 is at the rear end of the sliding slot 424, and the other limiting groove 86 is at a middle of the sliding slot 424. A distance between the two limiting grooves 86 is the same as a distance of the two bolts 22 at the same side of the storage device 20. In this embodiment, each limiting groove 86 is L-shaped, and extends perpendicularly from the sliding slot 424, bending backwards. It should be understood that the limiting grooves 86 are for receiving the bolts 22, and the number and positions of the sliding slots 424 are determined according to the bolts 22 of the storage device 20.

When assembling the storage device 20, the bolts 22 of the storage device 20 slide along the sliding slot 424 and then enter into the limiting grooves 86. Thus, the storage device 20 is positioned on the brackets 82, and cannot move along the sliding slots 424. Finally, the latching member 50 is assembled to the brackets 82 with the hooks 740 engage into the latching grooves 822 as described in the first embodiment to fix the storage device 20. Since the bolts 22 are limited in the limiting grooves 86 and storage device 20 is immovable, assembly of the latching member 50 to the brackets 82 is easier. In other words, assembly of the storage device 20 is easier.

It is to be understood, however, that even though numerous characteristics and advantages of embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting mechanism for assembling a storage device, comprising:
a pair of parallel brackets defining a space therebetween for receiving the storage device, each of the brackets defining a sliding slot for supporting the storage device, a limiting groove being defined in each of the brackets, the sliding slot extending through a lateral edge of the bracket, the limiting groove extending downwards from the sliding slot and communicating with the sliding slot, a latching hole being defined in one of the brackets; and
a latching member comprising a resisting portion for abutting the storage device and a pair of latching portions formed at opposite ends of the resisting portion, a hook being formed on one of the latching portions and engaged in the latching hole;
wherein each of the latching portions comprises an inner plate connected to the resisting portion, an outer plate, and a connecting plate interconnecting the inner plate and the outer plate, each bracket being sandwiched between the inner plate and the outer plate of a corresponding latching portion with the latching hole facing the hook.

2. An electronic device comprising:
a chassis;
a storage device, a plurality of bolts being arranged at opposite sides of the storage device; and
a mounting mechanism for assembling the storage device, comprising:
   a pair of parallel brackets fixed in the chassis and defining a space therebetween for receiving the storage device, each of the brackets defining a sliding slot for accommodating the bolts of the storage device and a latching hole; and
   a latching member comprising a resisting portion for abutting the storage device and a pair of latching portions formed at opposite ends of the resisting portion, each of the latching portions comprising a hook engaged in the latching hole of the bracket,
wherein each of the bolts comprises a pole and a head formed at a distal end of the pole, an annular notch being defined in the head of the bolt, a portion of the head corresponding to the annular notch being narrower in diameter than the other portion of the head without the annular notch, the portion of the head with the annular notch being in the sliding slot, the other portion of the head without the annular notch sandwiching the bracket around the sliding slot.

3. The electronic device of claim 2, wherein the sliding slot is as wide as the diameter of the head of the bolt at the annular notch, but narrower than the diameter of the other portion of the head of the bolt.

4. The electronic device of claim 2, wherein a limiting groove is defined in each of the brackets, the limiting groove extending downwards from the sliding slot and communicating with the sliding slot.

5. The electronic device of claim 2, wherein a supporting portion protrudes outwards from each of the brackets, the sliding slot being defined in the supporting portion and being shorter than the supporting portion.

6. The electronic device of claim 2, wherein the resisting portion of the latching member comprises a top board, a bottom board and a side board interconnecting lateral edges of the top board and the bottom board, a plurality of protruding ribs extending outwards from the side board for resisting the storage device.

7. The electronic device of claim 2, wherein each of the latching portions comprises an inner plate connected to the resisting portion, an outer plate, and a connecting plate interconnecting the inner plate and the outer plate, the hook being formed on the outer plate and facing the inner plate.

8. The electronic device of claim 7, wherein a plurality of anti-skid ribs are formed on the outer plate, the anti-skid ribs and the hook being formed at opposite ends and opposite sides of the outer plate.

9. A mounting mechanism for assembling a storage device, comprising:
   a pair of parallel brackets defining a space therebetween for receiving the storage device, each of the brackets defining a sliding slot for supporting the storage device, a latching hole being defined in one of the brackets; and
   a latching member comprising a resisting portion for abutting the storage device and a pair of latching portions formed at opposite ends of the resisting portion, a hook being formed on one of the latching portions and engaged in the latching hole;
wherein each of the latching portions comprises an inner plate connected to the resisting portion, an outer plate, and a connecting plate interconnecting the inner plate and the outer plate, each bracket being sandwiched between the inner plate and the outer plate of a corresponding latching portion with the latching hole facing the hook;
wherein the resisting portion of the latching member comprises a top board, a bottom board and a side board interconnecting lateral edges of the top board and the bottom board, a plurality of protruding ribs extending outwards from the side board for resisting the storage device; and
wherein a plurality of reinforcement plates are arranged between the top board and the bottom board, and connect the side board.

* * * * *